US007973651B2

(12) United States Patent
Stiles et al.

(10) Patent No.: US 7,973,651 B2
(45) Date of Patent: Jul. 5, 2011

(54) TRANSMITTER APPARATUS AND SYSTEM FOR REMOTE SIGNALING

(76) Inventors: Terry J. Stiles, Malta, MT (US); Kenji Kokaji, Edmonton (CA); Matthew J. Kosolofski, Calgary (CA); Randal D. P. Penman, Olds (CA)

( * ) Notice: Subject to any disclaimer, the term of this patent is extended or adjusted under 35 U.S.C. 154(b) by 485 days.

(21) Appl. No.: 11/632,353

(22) PCT Filed: Jul. 13, 2004

(86) PCT No.: PCT/US2004/022155
§ 371 (c)(1),
(2), (4) Date: Jun. 26, 2008

(87) PCT Pub. No.: WO2006/016872
PCT Pub. Date: Feb. 16, 2006

(65) Prior Publication Data
US 2008/0258899 A1     Oct. 23, 2008

(51) Int. Cl.
*G08B 21/00* (2006.01)
(52) U.S. Cl. ......... 340/431; 340/463; 340/468; 340/475
(58) Field of Classification Search .......... 340/463–479, 340/431
See application file for complete search history.

(56) References Cited

U.S. PATENT DOCUMENTS

| | | |
|---|---|---|
| 1,510,912 A | 10/1924 | Allen |
| 2,843,952 A | 7/1958 | Zgraggen |
| 3,866,169 A | 2/1975 | Haglund |
| 4,187,494 A | 2/1980 | Jessee |
| 4,712,167 A | 12/1987 | Gordin et al. |
| 4,722,030 A | 1/1988 | Bowden |
| 4,801,917 A * | 1/1989 | Winterfeld ............ 340/475 |
| 4,859,982 A | 8/1989 | Seaburg |
| 5,195,813 A | 3/1993 | Brown |

(Continued)

FOREIGN PATENT DOCUMENTS

CA          2090438          10/1995

(Continued)

OTHER PUBLICATIONS

International Search Report mailed Apr. 20, 2005 in corresponding International Application No. PCT/US2004/022155.

(Continued)

*Primary Examiner* — Brent Swarthout
(74) *Attorney, Agent, or Firm* — Seed IP Law Group PLLC

(57) ABSTRACT

An electronic system is described for controlling vehicle message lighting including turn and stop indicator signal lights, which system does not require any pre-existing wiring harness in either a towing vehicle 101 or any towed vehicle 104 to be in serviceable condition. In one embodiment the system implements a reliable wireless detection method based on feedback to confirm the state of operation of any such pre-existing "vehicle indication signal drive line" and includes a control apparatus that wirelessly transmits 230 instructions to at least one local receiver 150 controlling a number of message devices, including, but not limited to, vehicle indication signal lights. Another embodiment of the system bypasses any pre-existing wiring harness and permits the operator to manually over ride its detector. Advantageously, the portable control transmitter apparatus and each receiver apparatus 150 of the invented system are easily installed by a nontechnical person requiring minimal tooling and then operated by an unskilled user.

1 Claim, 9 Drawing Sheets

U.S. PATENT DOCUMENTS

| | | | |
|---|---|---|---|
| 5,198,798 | A | 3/1993 | Lietzow et al. |
| 5,424,715 | A | 6/1995 | Lietzow et al. |
| 5,442,332 | A | 8/1995 | Hughes |
| 5,442,810 | A | 8/1995 | Jenquin |
| 5,488,352 | A | 1/1996 | Jasper |
| 5,666,103 | A | 9/1997 | Davis, Jr. |
| 5,900,803 | A | 5/1999 | Politz et al. |
| 5,905,433 | A | 5/1999 | Wortham |
| 5,909,173 | A * | 6/1999 | Mason et al. ............... 340/467 |
| 5,917,632 | A | 6/1999 | Lesesky |
| 5,920,128 | A | 7/1999 | Hines |
| 6,002,329 | A * | 12/1999 | Marks .................... 340/467 |
| 6,043,739 | A | 3/2000 | Henderson |
| 6,100,801 | A | 8/2000 | Plummer |
| 6,525,654 | B1 | 2/2003 | Siggers |
| 6,604,038 | B1 | 8/2003 | Lesesky et al. |
| 6,677,856 | B2 | 1/2004 | Perlman et al. |
| 6,933,839 | B2 | 8/2005 | Henry |
| 6,970,074 | B2 | 11/2005 | Perlman |
| 7,253,721 | B2 * | 8/2007 | Flohr et al. ............... 340/431 |
| 2003/0095041 | A1 | 5/2003 | Perlman et al. |

FOREIGN PATENT DOCUMENTS

| | | |
|---|---|---|
| WO | WO 89/11984 | 12/1989 |

OTHER PUBLICATIONS

Advertisement for "Radio Controlled" tow lights, Custer Products Limited [2 pages].

Advertisement for "Wireless Tow-Lights," PickupSpecialties.com, printed on Jan. 11, 2005 [4 pages].

* cited by examiner

TRANSMITTER APPARATUS AND SYSTEM FOR REMOTE SIGNALING

FIELD OF THE INVENTION

The present invention relates generally to vehicle position and movement indicator systems, and particularly to a transmitter apparatus for use with turn and stop indicator signal lighting of such systems in a towing vehicle or a trailing vehicle.

BACKGROUND OF THE INVENTION

Conventional wire line vehicle indicator signal systems suffer many problems over time, particularly where a towing vehicle is to supply indicator signals to a trailing vehicle. A safety problem arises when such systems fail to reliably deliver indicator signals to the trailing vehicle. Even when a system is initially working correctly, factors enroute (e.g. rough roads and brush in forests and water in streams & lakes) can cause the system to fail in a manner that is difficult to correct when traveling. Various attempts have been made to avoid or solve these problems.

In U.S. Pat. No. 6,677,856 issued to Pearlman and Looper ("856") the inventors teach only physical means of coupling to an existing "vehicle indication signal drive line" by tapping into the wiring harness of a vehicle. Disadvantageously, this requires an installer to remove components of the vehicle and connect to specific wires in a wiring harness (that differs from vehicle to vehicle), making 856 unsuitable for any average end user to install and setup, as well as non-portable.

In U.S. Pat. No. 5,666,103 issued to Davis ("103") teaches a kit including sensor means for installation in suggests an alternate embodiment using a "Hall-effect probe" not physically connected to the power source, it fails to teach how to solve the substantial problem arising from the need to distinguish between low power signals without removing parts from the towing vehicle in order to locate and identify the individual conductors in the wiring harness of that vehicle, which is again beyond the skill of the average end user of the 103 kit.

By way of context, vehicle indication signal systems typically include turn, hazard, and brake "signal" lights to alert nearby drivers of the circumstances of the vehicle from which they are displayed. The varying use of the term "signal" in this industry is clear from the context, it can mean the visible light actually alerting drivers, or a transmitted electrical pulse that causes that emission of light. Also, running lights are typically an extra filament inside a light-bulb of either a brake light or turn signal light, but could be separate light bulbs. And, on larger vehicles such as transport trucks and their trailers, running lights include marker and clearance lighting. None of the prior art identified to date has addressed such additional lighting requirements wirelessly.

Prior art in the vehicle indicator signal lighting industry has concentrated on teaching variations on controlling devices that are physically connected to an existing wiring harness, which requires tools to access and knowledge to use. Therefore, it is desirable to have a way to reliably control remote indicator signals without connecting to any vehicle wiring harness.

SUMMARY OF THE INVENTION

The apparatus and system of the present invention advantageously permit an unskilled user, without invasive installation techniques, to quickly setup and reliably use an existing vehicle indicator signaling system to wirelessly activate a second indicator signaling system coupled to one or more trailing vehicles. An electronic system is described for controlling vehicle message lighting (including turn and stop indicator signal lights), which system need not connect to any wire in the towing vehicle and in fact does not require any pre-existing wiring harness in either a towing vehicle or any towed vehicle to be in serviceable condition. Installing the apparatus in a towing vehicle, requires no parts to be removed from that vehicle and no wires or other components of that vehicle to be located, identified, or tapped into. Consequently, the apparatus of the present invention is suitable for installation by anyone and can easily be moved between towing vehicles by an unskilled user. Once positioned in a towing vehicle, setup of the apparatus requires no more skill than is needed to preset the channels on a modern car radio.

According to one aspect of the invention, there is provided a method of wirelessly operating a remote vehicle indication signal system, from a vehicle having a wired vehicle indication signal system that has generated a vehicle indication signal, the method comprises the steps: wirelessly detect the vehicle indication signal generated by the wired vehicle indication signal system; and wirelessly transmit, to a receiver of the remote vehicle indication signal system, instructions to activate a remote vehicle indication signal that corresponds to the vehicle indication signal generated by the wired vehicle indication signal system. And, to wirelessly detect the vehicle indication signal generated by the wired signal system, a photosensor detects light or infrared emissions caused by the wired vehicle indication signal system.

There is further provided a method of wirelessly operating a vehicle indication signal system, from a vehicle having no serviceable wiring harness, using a transmitter apparatus having a plurality of operator input devices. The method comprises the steps: activate an input device corresponding to a vehicle indication signal; and wirelessly transmit instructions, to at least one receiver, to generate the vehicle indication signal corresponding to the input device activated. The vehicle indication signal may be selected from the group consisting of: a turn signal, a brake signal, a backup signal, and a hazard signal.

According to another aspect of the invention, there is provided a transmitter apparatus, for use as part of a vehicle indication signal system, the apparatus comprising: a base communicably coupleable to a vehicle; input means coupled to the base, for providing input instructions to the apparatus respecting a vehicle indication signal; processing means communicably connected to the input means, for executing the input instructions and generating output instructions in response to those input instructions; and output means communicably connected to the processing means, for wirelessly sending the output instructions to at least one receiver that delivers the vehicle indication signal. The base is communicably coupled to the vehicle in a manner selected from the group consisting of: permanently built-in to a portion of the vehicle, modularly insertable into and removable from a cavity in the vehicle, and surface mounted to a portion of the vehicle. The input means comprises a photo-sensor mounted in visual communication with: an external signal lamp, an external signal lamp lens, or an internal instrument panel lamp for a vehicle indication signal system on a towing vehicle, and the receiver is coupled to a trailing vehicle. The input means are selected from the group consisting of: a signal lever, a hazard switch, a brake activation sensor, an ignition switch, a plurality of general purpose switches, a multi-function switch, a keypad, a photo-sensor, a sequential switching circuit, a data bus, a microphone, and an electromagnetic card. The vehicle indication signal is selected from the group consisting of: an emission of visible light, a text message, a symbolic message, an audible emission of sound, and a combination of the foregoing.

There is further provided a detector transmitter apparatus, for use as part of a vehicle indication signal system for remote secondary signaling, the apparatus comprising: a base; wireless detection means coupled to the base, for detecting at least one primary signal without coupling to a source of signals; processing means communicably connected to the wireless detection means, for identifying a primary signal and generating output instructions in response thereto; and output means communicably connected to the processing means, for wirelessly sending the output instructions a remote receiver that delivers a secondary signal. The primary signal is of a type selected from the group consisting of: electromagnetic field disturbance, visible light, velocity, position, sound, fluid motion, and fluid pressure. For example, the primary signal may arise from electrical current in a conductor of the vehicle indication signal system, and the wireless detection means comprises at least one electromagnetic sensor circuit positioned proximal such source of primary signals, for detecting a disturbance of an electrostatic field proximal the source of primary signals. The source of primary signals may further comprise a flasher cube that generates a distinct electromagnetic signal upon activation of each of left turn, right turn, and hazard indicator lights of the vehicle indication signal system. The wireless detection means may further comprise at least one visible light sensor positioned proximal a vehicle indicator light for detecting visible light emitted from the vehicle indicator light. The wireless detection means may further comprise at least one inertial sensor coupled to a vehicle for detecting changes in velocity of the vehicle or in position of any portion of the vehicle. The wireless detection means may further comprise a scanner and at least one reflector affixed in a known position relative to a signal lever or brake arm member for detecting changes in position of the signal lever or brake arm member. The wireless detection means may further comprise a microphone for detecting voice commands from an operator of the apparatus. The output means comprises a transmitter assembly for which transmission is effected using technology selected from the group consisting of: radio frequency ("RF"), infrared ("IR"), microwave, laser, sonic, and ultrasonic. Optionally, the apparatus may further comprise input means selected from the group consisting of: a signal lever, a hazard switch, a brake activation sensor, an ignition switch, a plurality of general purpose switches, a multi-function switch, a keypad, a photo-sensor, a sequential switching circuit, a data bus, a microphone, and an electromagnetic card. The base may comprise a housing coupled to the vehicle in a manner selected from the group consisting of: permanently built-in to a portion of the vehicle, modularly insertable into and removable from a cavity in the vehicle, and surface mountable to a portion of the vehicle further having means for securing the apparatus in a position proximal a source of primary signals. Or, the base may be portable and not mounted to the vehicle—for permitting handheld use.

According to one aspect of the invention, there is further provided a wireless receiver apparatus, for use in a vehicle indicator signal system, the apparatus comprising: a base, for coupling the receiver apparatus to a vehicle; a single or multi-channel wireless receiver, coupled to the base, for wirelessly receiving instructions from a transmitter apparatus; a processor communicably coupled to the wireless receiver, for interpreting the instructions and generating a message in response thereto; and a display communicably coupled to the processor for delivering the message. The base couples to the vehicle in a manner selected from the group comprising: permanently built-in to a portion of the vehicle, modularly insertable into and removable from a cavity in the vehicle, and releasably surface-mounted to a portion of the vehicle. The receiver comprises any suitable low power AM or FM receiver. The processor comprises any suitable microprocessor or programmable logic controller together with power supply, input/output interface circuitry, and memory circuitry. The display comprises any suitable lighting package selected from the group consisting of: a light bulb, a plurality of low power light bulbs, a light-emitting diode ("LED"), an LED array, and a plasma text display. The base optionally comprises a sealed, surface mountable, submersible, waterproof, dust-proof, and shock resistant housing, with a solar charging battery power supply circuit and a photocell circuit, for automatically engaging and disengaging running lights.

According to another aspect of the invention, there is provided a system for use with a towing vehicle and at least one trailing vehicle, the system comprising: the transmitter apparatus or the detector transmitter apparatus as described above; together with the above wireless receiver apparatus. The system further comprises at least one feedback sensor supplying information to the processor, for the purpose of confirming compliance by the receiver apparatus with the instructions from the transmitter apparatus or the detector transmitter apparatus. The system further comprises input means selected from the group consisting of: a windshield wiper & washer switch, a cruise control switch, a micro-phone, a camera, a radar detector, a sway detector, a blowout sensor, a photocell, and a vehicle position sensor. The system further comprises a transmitter cavity in a steering column or a steering wheel of a vehicle. There is further provided a transmitting flasher cube apparatus, for use with the above vehicle indicator signal system, the apparatus comprising: a flasher cube together with means for generating and transmitting a signal that is detectably distinct as between its left turn and right turn outputs.

According to one aspect of the invention, there is further provided a transmitting signal lamp apparatus, for use with a vehicle indicator signal system, the apparatus comprising: a light bulb together with means for emitting a distinct low power AM or FM signal when the light bulb is in operation. There is further provided a transmitting photo-sensor apparatus, for use over external lenses or internal instrument panel indicators of a vehicle indicator signal system, the apparatus comprising: a photocell together with means for emitting a distinct low power AM or FM signal when the photocell detects a light emission above a defined level. There is further provided a transmitting pressure-sensor apparatus, for use with a vehicle indicator signal system, the apparatus comprising: a pressure sensitive transducer together with means for emitting a distinct low power AM or FM signal when the transducer detects a change in or the presence of fluid, gas, or mechanical pressure above a defined level. There is further provided a transmitting motion-sensor apparatus, for use with a vehicle indicator signal system, the apparatus comprising: an inertial transducer together with means for emitting a distinct low power AM or FM signal when the transducer detects a change in its motion. There is further provided a transmitting scanner apparatus, for use with a vehicle indicator signal system, the apparatus comprising: a laser bar code scanner assembly together with means for emitting a distinct low power AM or FM signal when the transducer detects a change in position of a signal lever or a brake arm member of a vehicle. There is further provided a receiver headlight apparatus, for use with a vehicle indicator signal system, the apparatus comprising: a head lamp together with means for receiving and decoding an encoded signal from a transmitter apparatus.

The accompanying drawings, which are incorporated in and constitute a part of this specification, illustrate preferred embodiments of the method, apparatus, and system according to the invention and, together with the description, serve to explain the principles of the invention.

BRIEF DESCRIPTION OF THE DRAWINGS

The present invention, in order to be easily understood and practised, is set out in the following non-limiting examples shown in the accompanying drawings, in which.

DETAILED DESCRIPTION OF THE PREFERRED EMBODIMENT

Figure 1:
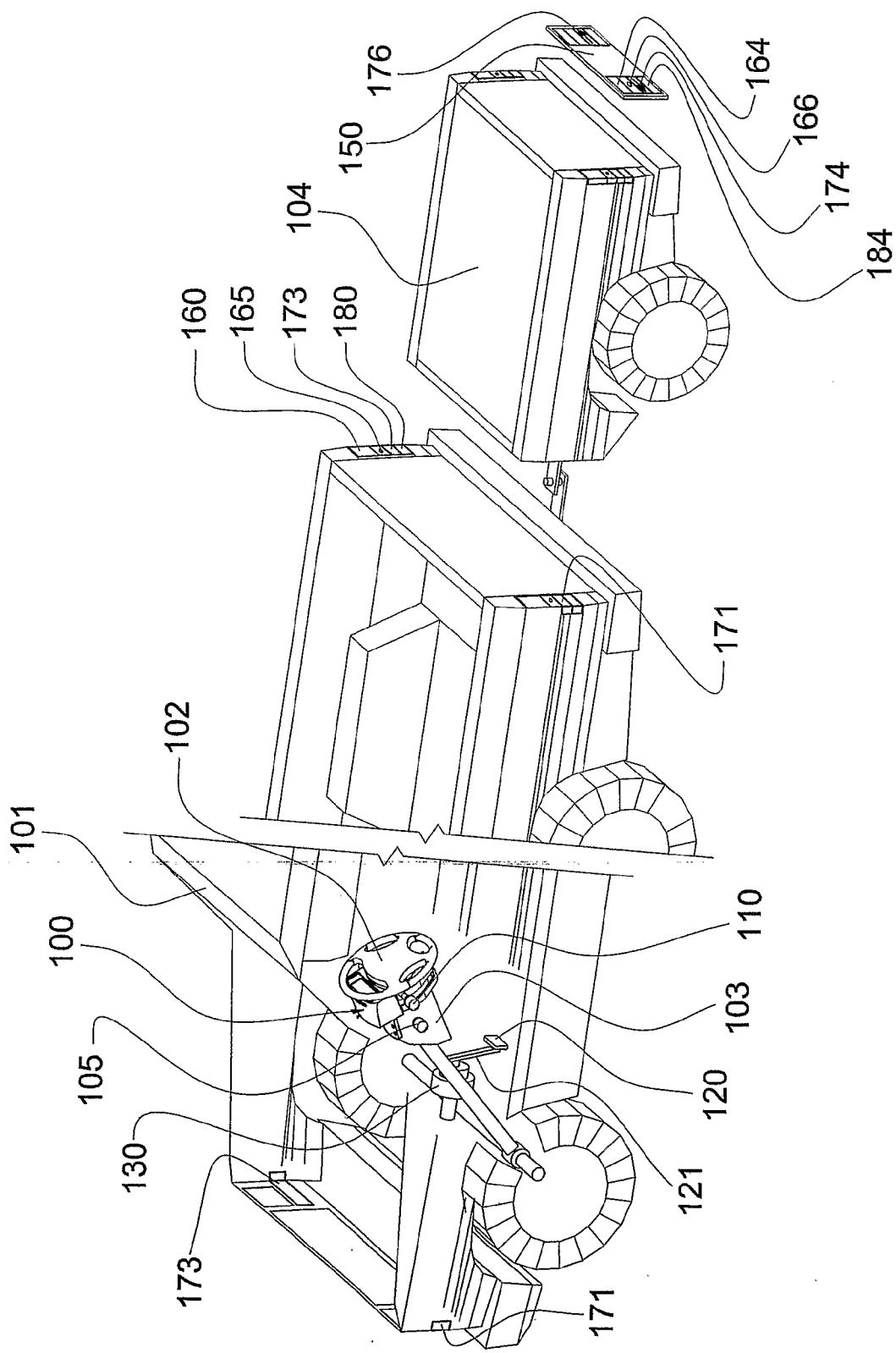
FIG. 1 illustrates one embodiment of the system of the present invention shown in isometric view installed in a towing vehicle having a single trailing vehicle.

Referring to FIG. 1 there is illustrated an embodiment of the apparatus of the present invention denoted generally as 100 shown coupled to a towing vehicle 101 near its steering wheel 102 where an operator has easy access to apparatus 100. A "hazard signal" switch 105 and a turn signal lever 110 are commonly mounted on steering column 103. Inside steering column 103 is a portion of the wiring harness (not shown) of the vehicle indication system of towing vehicle 101, such that the activation of signal lever 110 or hazard signal switch 105 creates a changing electromagnetic field disturbing the ambient electrostatic field (not shown) proximal steering column 103.

Electromagnetic disturbances of different strength arise in different vehicles, since in some vehicles, small supply currents flow intermittently in wiring harness conductors when vehicle indication system input devices (e.g. hazard signal switch 105 or signal lever 110 ) are active. While, in other vehicles, tiny trigger currents flow continuously in different conductors leading to a relay device (not shown) that causes such supply currents to flow intermittently in different conductors leading to different "signal lights". Similarly, when brake pedal 120 is moved by an operator there is a change in the position of brake pedal arm member 121 as well as the pressure and position of fluid inside master cylinder 130 and its associated brake lines (not shown). When hazard signal switch 105, turn signal lever 110, or brake pedal 120 are applied by an operator of vehicle 101, light is emitted through left turn signal lense 171, right turn signal lense 173, or brake light lenses 160, depending upon which input device the operator activates.

According to a preferred embodiment of the system of the present invention, trailing vehicle 104 has its own brake light lenses 164, left turn signal lense 174, right turn signal lense 176, and backup light lenses 184 that correspond to and are wirelessly activated by apparatus 100 when light is emitted from brake light lenses 160, left turn signal lense 171, right turn signal lense 173, and backup light lenses 180 respectively of towing vehicle 101. Trailing vehicle 104 may have brake light lense 164, left turn signal lense 174, and a backup light lense 184 all permanently mounted (as illustrated on the rear of trailing vehicle 104 ) together as a lighting package that is built-in to trailing vehicle 104. However, according to an alternate embodiment of the system of the present invention this lighting package may be modular and easily removable from a cavity (not shown) in trailing vehicle 104. Such a lighting package may also be surface-mounted to a vehicle by a magnet (e.g. to a bumper) or other device for releasably but securely coupling a lighting package to a vehicle in a manner suitable for use on public highways. For each foregoing embodiment of the system of the present invention, such lighting package (e.g. receiver display 150) wirelessly receives instructions to emit light.

According to a preferred embodiment of the system of the present invention, each light emitting tense of towing vehicle 101 also has a transmitting photosensor 165 (e.g. a photocell with any short range AM or FM encoded mini-transmitter such as those used in garage door openers or automotive lock key fobs) mounted thereon. Similarly, for example, each brake light lense 164 of trailing vehicle 104 has a transmitting photosensor 166 mounted thereon. Apparatus 100 wirelessly detects transmissions from one or more photosensor 165 that confirm any change in light intensity under one or more brake light lense 160 of towing vehicle 101, which change indicates the operation of brake pedal 120 in towing vehicle 101, such that (subject to error-checking functionality programmed into it) apparatus 100 activates brake lights on trailing vehicle 104. Substantially the same result is achieved in vehicles having instrument panels with internal indicator lights (e.g. arrows) to alert the operator that its vehicle indication system is in operation. Transmitting photo-sensors 165 affixed to an instrument panel detect light emitted from said internal indicator lights (not shown) without interfering with their use. Similarly, a transmitting photosensor 165 may be affixed to a brake light lense in the centre of the bottom of the rear window (not shown) of towing vehicle 101. For increased reliability of the system of the present invention, transmissions from photosensor 165 are correlated by apparatus 100 with information from other kinds of sensors. For example, a piezoelectric pressure sensor (not shown) may be mounted in or on pedal 120, or a motion detection device (e.g. a mercury switch) may be mounted in or on brake pedal arm member 121, or a mechanical switch (not shown) commonly associated with brake pedal arm member 121 may be used to confirm that changes in light intensity detected by photosensor 165 are the result of the activation of a related input device by the operator of towing vehicle 101.

Further developing the present example (based on brake lighting, but applicable to all vehicle indication system lighting), it is contemplated that transmissions from one or more photosensor 166 on trailing vehicle 104 may be used as feedback to confirm to apparatus 100 that the brake lights of trailing vehicle 104 were in fact activated as intended. Such feedback from photo-sensors 166 and photo-sensors 165 may be used by apparatus 100 to alert the operator of towing vehicle 101 to the failure of various components, such as a "burned out" light bulb.

According to an alternate embodiment of the system of the present invention a transmitting photosensor 165 may directly trigger the operation of lighting on trailing vehicle 104. For example, a wireless device (controlling vehicle indication system lighting on trailing vehicle 104) for receiving instructions to emit light (through one or more of brake light lense 164, left turn signal lense 174, right turn signal lense 176, and backup light lense 184) may accept encoded instructions: from control apparatus 100, or from photosensor 165 directly, or from both. Advantageously, reliability is enhanced and erroneous activations (of indication system lighting on trailing vehicle 104) are reduced when controlling apparatus 100 correlates information from different sources. However, simplicity is enhanced and costs are reduced when transmitting photo-sensors 165 on towing vehicle 101 are linked directly to at least one wireless receiver on trailing vehicle 104. According to a low cost embodiment of the wireless detection method of the present invention, no intermediate controlling device is required when transmitting photo-sensors 165 on vehicle 101 communicate directly with a lighting package (e.g. receiver display 150) on trailing vehicle 104. Advantageously, an unskilled user can quickly attach (e.g. magnetically) and activate (e.g. by a power switch) a pair of multi-sensor devices to the rear of vehicle 101 and a corresponding lighting package (described in greater detail below) to trailing vehicle 104.

It is contemplated that the system of the present invention may implement one or more wireless receivers as part of one or more lighting packages to control all vehicle indication system lighting on trailing vehicle 104. For example, according to an alternate embodiment of the system of the present invention, rather than one lighting package (e.g. brake, turn, running, backup) on each side of trailing vehicle 104—an elongate "light bar" including a single wireless receiver and having both left and right groups of signal lighting may be magnetically coupled to the rear of trailing vehicle 104. Light bars include LED-illuminated dot-matrix displays and other suitably visible (e.g. plasma or bright character display) display devices. According to a preferred embodiment of the system of the present invention, receiver display 150 is a battery operated wireless receiver and LED display having a plastic or other light-weight and water proof housing that is portable and easily attached to the bumper of trailing vehicle 104.

Figure 2:
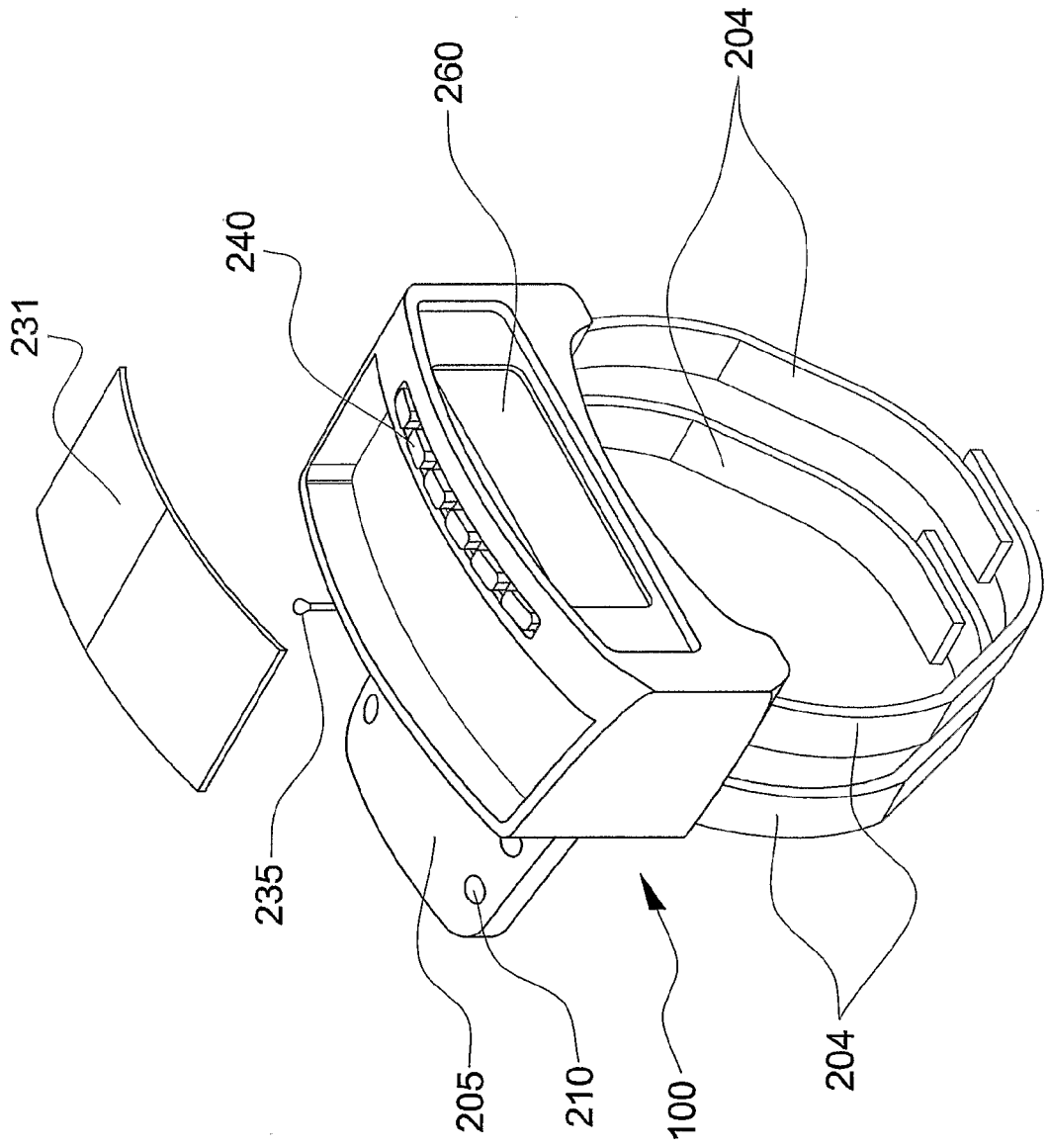
FIG. 2 illustrates one embodiment of the detector transmitter apparatus of the present invention shown in isometric view.

Referring to FIG. 2, one embodiment of wireless detection apparatus 100 is shown having sensor array 205 comprised of a plurality of spatially separated electromagnetic (e.g. Hall-effect) sensors or electrodes 210. An electrostatic field (not shown) exists proximal each electrode 210. When an electromagnetic field disturbance arises proximal sensor array 205, the position of the source (not shown) of electric charge causing that disturbance affects the amplitude or strength of said electrostatic field present at each electrode 210. Since electrostatic field strength varies with the inverse cube of distance, and each electrode 210 is located a different distance from said source (as well as being uniquely oriented relative to that source), the strength of said electrostatic field present at each electrode 210 will also be different as compared to that at other electrodes 210 forming sensor array 205. For a given relative position of sensor array 205, each unique source position will result in a unique "pattern" of measured electrostatic field strength as recorded over said plurality of electrodes 210. According to a preferred embodiment of the apparatus of the present invention, these unique patterns are used to distinguish between different sources of charge that are proximal apparatus 100 when coupled to vehicle 101.

According to one of its embodiments, apparatus 100 is coupled to vehicle 101 by securing strap members 204 around steering column 103 near steering wheel 102, such that sensor array 205 is near steering column 103 wherein turn signal and hazard light supply or trigger conductors (not shown) are located and carry moving charge sources of electromagnetic field disturbance influencing said pattern of measured electrostatic field strength as recorded proximal sensor array 205 whenever a turn signal or hazard light of vehicle 101 is active.

Removable cover 231 permits access for service (including battery replacement), to circuitry (described in greater detail below) for processing (the measured electrostatic field strength readings proximal sensor array 205) and transmitting instructions, to at least one wireless receiver on trailing vehicle 104, using antenna 235. Keypad 240 permits apparatus 100 to be trained to identify the meaning of each unique pattern of measured electrostatic field strength, which training is facilitated by an optional display screen 260. Once wireless detection apparatus 100 is trained to identify unique patterns of measured electrostatic field strength created by the operation of vehicle indication system lighting, it is used to periodically sample the electrostatic field proximal steering column 103 and transmit instructions in programmed circumstances. For example, if turn signal lever 110 or hazard signal switch 105 are activated and the resulting pattern detected, then apparatus 100 sends instructions, via an encoded low-power radio frequency ("RF") transmission, to at least one wireless receiver on trailing vehicle 104, or towing vehicle 101, or both. It is contemplated that infrared ("IR"), microwave, laser, acoustic, and other encodeable transmission means may be adapted to communicate wirelessly between apparatus 100 and wireless receivers nearby.

Figure 3:
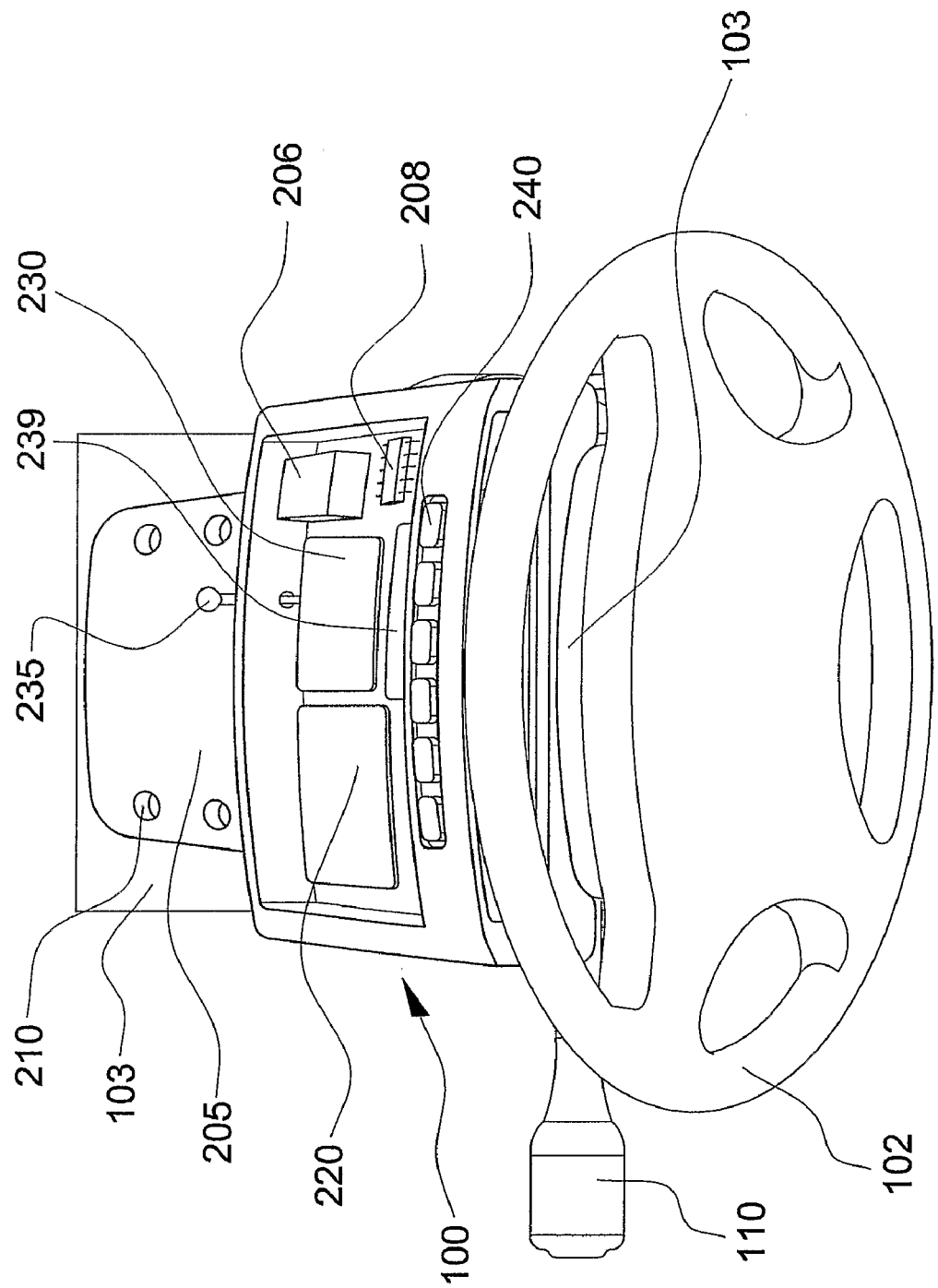
FIG. 3 illustrates one embodiment of the detector transmitter apparatus of the present invention shown in top view.
Figure 4:
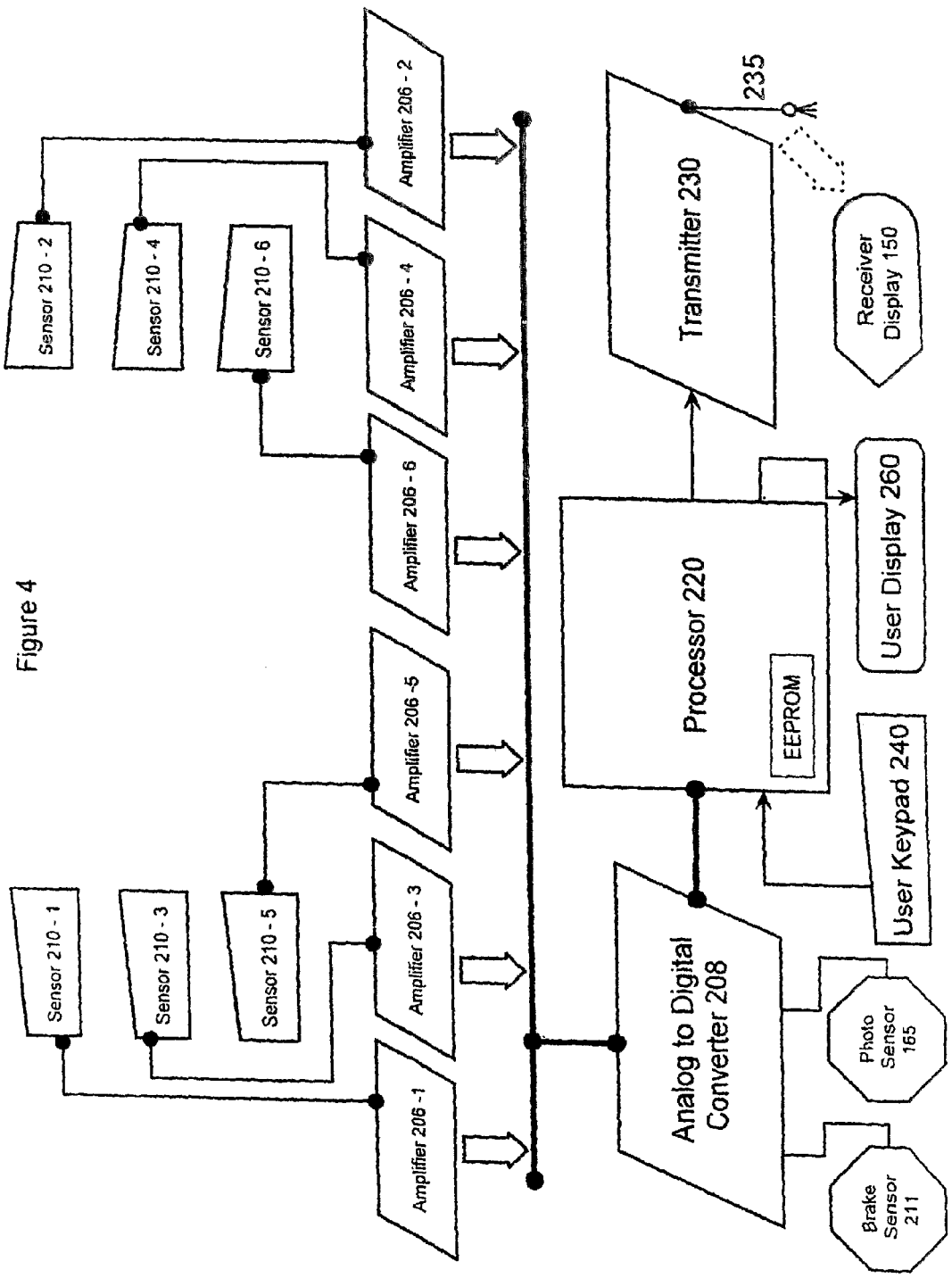
FIG. 4 illustrates one embodiment of the circuit of the apparatus of the present invention shown in block view.

Referring to FIGS. 3 and 4, according to one embodiment of the apparatus of the present invention, circuitry comprising: at least one amplifier 206 (e.g. Analog Devices AD628), A/D Converter 208 (e.g. Analog Devices AD7927, SPI compatible multi-input), brake sensor 211, processor 220 (any suitable programmable logic controller or "PLC", such as the Motorola MC68HC11), transmitter 230 (e.g. ABACOM AM-TX1, or LEMICON TX3A), and power supply 239 (e.g. batteries) is illustrated. After training (in a particular vehicle 101) and initialization, when sensor array 205 is exposed to a pattern (of measured electrostatic field strength) that matches one of the patterns with which apparatus 100 was so trained, an amplifier 206 proportionately amplifies to a detectable level the (typically analog) sample reading of electrostatic field strength present at each electrode 210 such that A/D Converter 208 can digitize that measurement for use by processor 220, which compares (as set out in greater detail below) that sample with stored patterns and, if a match is found, generates a set of instructions for transmitter 230 to send via antenna 235 to at least one wireless receiver (e.g. receiver display 150) on trailing vehicle 104. Any suitable wireless receiving device (e.g. ABACOM AM-HRR3/6 or LEMICON RX3A) code matched to the selected transmitter 230 (e.g. ABACOM AM-TX1, or LEMICON TX3A) may be used inside receiver display 150 to detect and interpret encoded instructions from apparatus 100 and then generate a message based thereon. It is contemplated that lights of one or more colours simply flashing on and off, or more complex text generating displays may be used to deliver such messages.

Operating hazard switch 105 in towing vehicle 101 will also create a unique pattern that may be identified using sensor array 205 to sample readings of electrostatic field strength proximal steering column 103. However, a separate brake sensor 211 is desirable to communicate with apparatus 100, since the conductors carrying power to brake lighting on towing vehicle 101, typically, do not pass sufficiently close to steering column 103 to be detectable using sensor array 205. Similarly, any photosensor 165 used in a feedback role to detect light emissions (rather than the currents that are their activating power) from a vehicle indicator system, are connected to A/D Converter 208 through any suitable circuitry that depends on the component selected for use as transmitting photosensor 165. It is to be understood that a transmitting photosensor 165 may be used as one form of brake sensor 211 to supply information to controlling apparatus 100 regarding the braking activity of towing vehicle 101.

According to one embodiment of apparatus 100, each pattern of measured electrostatic field strength sampled at array 205 is identified (or rejected) by comparing it to a plurality of such patterns stored (e.g. in EEPROM) during training, and, if a match is identified, then information is generated by processor 220 based on firmware stored (e.g. in ROM) in or accessible to processor 220, and instructions (e.g. to flash in accordance with a set of pre-programmed rules) are delivered by transmitter 230. For example, if during its use apparatus 100 identifies a pattern (proximal steering column 103) that sufficiently closely matches the particular pattern identified during training while turn signal lever 110 was in the left turn position, then the instructions delivered by transmitter 230 will typically cause light to be emitted from left turn signal lense 174 on trailing vehicle 104. The simple message thereby emitted by trailing vehicle 104 is commonly understood to be that the operator of vehicle 101 intends to cause vehicles 101 and 104 to move left. The rules governing the emission of that message may, for example, be as simple as "continue flashing at rate X until pattern match is lost for 2 seconds", or "flash 5 times at intervals of 0.5 seconds, then stop". Many rules are well-suited to implement the common courtesies of driving. On the other hand if no match is identified, then apparatus 100 typically sends no instructions to any receiver display 150 on trailing vehicle 104. It is to be understood that patterns need not be matched exactly in order for apparatus 100 to generate information and transmit its encoded instructions. A tolerance (i.e. permitted margin of error) is applied to the matching of said patterns, which tolerance is adjustable according to the amplitude of the measured electrostatic field strength in towing vehicle 101 and the particular component selected for use as each sensor 210. Generally, the larger said amplitude and the more sensitive said component, the smaller the range (i.e. base +/−) of tolerance set to avoid false positives or negatives in transmitting instructions to trailing vehicle 104. In addition to adjusting tolerance to influence how "strong" a match is required—adjusting sample size influences the repeatability of the patterns being so matched. And, while increasing the number of sensors 210 used in array 205, by increasing said sample size, tends to increase the ability of apparatus 100 to distinguish patterns, correlating (in accordance with a set of pre-programmed rules) each sample with other indications (e.g. from transmitting photo-sensors 165) increases the reliability of all embodiments of apparatus 100. According to a preferred embodiment of the apparatus of the present invention, the rules governing control by apparatus 100 over message emissions from trailing vehicle 104 include measures increasing reliability, such as feedback from encoded transmitting photo-sensors 165, inertial sensors (not shown), position sensors (e.g. scanner 900) attached to signal lever 110, and other sources of information to confirm or deny a vehicle state consistent with an apparently matched pattern.

In use, with apparatus 100 secured to steering column 103, power can be taken from a lighter plug adapter, or batteries 239 and a small solar panel. Apparatus 100 is turned ON using a common power switch (preserving batteries when not in use) and then initialized upon its first power up in a given vehicle 101. Processor 220 may run diagnostics and require the operator to configure apparatus 100, if in a different vehicle since last configuration, for which instructions appear on display 260. For example, after pressing a SET (L) button, processor 220 acknowledges storage (in internal flash memory) of a pattern associated with Left turn and a message on display 260 changes to a request to activate the Right turn signal and so on. Once all available settings have been loaded into flash memory, apparatus 100 is ready for use and need not be re-configured if powered down in the same vehicle. Firmware suitable for the selected processing device used as processor 220, may, for example, cause processor 220 to scan all the registers of A/D Converter 208 for specified bits on a continual basis. If any registers are found to have changed, processor 220 will compare patterns (see below) and the appropriate sub-routine will be executed based on the results of that comparison. Further, upon detecting an input from a brake sensor 211, the controlling firmware may trigger a system interrupt for immediate action, giving brake lighting a high priority. According to a preferred embodiment of the system of the present invention, such firmware includes additional logic to allow for small shifts in the sensitivity of individual sensors 210 in array 205 to compensate for temperature effects. Apparatus 100 also permits verification that the system of which it is a part is functioning properly. For example, a corresponding LED illuminates whenever an indicator signal of vehicle 101 has been activated, and error messages are visible on display 260.

Processor 220 executes any suitable pattern recognition routine for each sample period. For example, but not in limitation, using an array 205 comprised of 8 sensors 210, every 0.50 seconds a sample reading of electrostatic field strength may be taken from each of said 8 sensors 210 by reading all 8 input terminals to A/D Converter 208 and temporarily registering those readings as follows:

VSD[0]=Read_AD(0);

VSD[1]=Read_AD(1);

VSD[2]=Read_AD(2);

VSD[3]=Read_AD(3);

VSD[4]=Read_AD(4);

VSD[5]=Read_AD(5);

VSD[6]=Read_AD(6);

VSD[7]=Read_AD(7);

Using, for example, the sample reading of electrostatic field strength taken from input # 1=VSD[0] at the present time, that reading is compared with each of the stored readings set in apparatus 100 in relation to input # 1 during training. The comparison is made relative to a base value +/− the error margin adjusted for apparatus 100 in a given position in towing vehicle 101 when using a given component for sensor 210 in an 8 electrode array 205. Assuming a simplified command set for an embodiment of apparatus 100 that distinguishes only between patterns stored for Left and Right turn signals, the pattern matching comparison may be executed as follows:

```
IF ( VSD[0] > LEFT[0] – error_margin OR VSD[0] < LEFT[0] +
error_margin) THEN left_detect_0 = 1; ELSE left_detect_0 = 0;
IF ( VSD[1] > LEFT[1] – error_margin OR VSD[0] < LEFT[1] +
error_margin) THEN left_detect_1 = 1; ELSE left_detect_1 = 0;
IF ( VSD[2] > LEFT[2] – error_margin OR VSD[0] < LEFT[2] +
error_margin) THEN left_detect_2 = 1; ELSE left_detect_2 = 0;
IF ( VSD[3] > LEFT[3] – error_margin OR VSD[0] < LEFT[3] +
error_margin) THEN left_detect_3 = 1; ELSE left_detect_3 = 0;
IF ( VSD[4] > LEFT[4] – error_margin OR VSD[0] < LEFT[4] +
error_margin) THEN left_detect_4 = 1; ELSE left_detect_4 = 0;
IF ( VSD[5] > LEFT[5] – error_margin OR VSD[0] < LEFT[5] +
error_margin) THEN left_detect_5 = 1; ELSE left_detect_5 = 0;
IF ( VSD[6] > LEFT[6] – error_margin OR VSD[0] < LEFT[6] +
error_margin) THEN left_detect_6 = 1; ELSE left_detect_6 = 0;
IF ( VSD[7] > LEFT[7] – error_margin OR VSD[0] < LEFT[7] +
error_margin) THEN left_detect_7 = 1; ELSE left_detect_7 = 0;
IF ( VSD[0] > RIGHT[0] – error_margin OR VSD[0] < RIGHT[0] +
error_margin) THEN right_detect_0 = 1; ELSE right_detect_0 = 0;
IF ( VSD[1] > RIGHT[1] – error_margin OR VSD[0] < RIGHT[1] +
error_margin) THEN right_detect_1 = 1; ELSE right_detect_1 = 0;
IF ( VSD[2] > RIGHT[2] – error_margin OR VSD[0] < RIGHT[2] +
error_margin) THEN right_detect_2 = 1; ELSE right_detect_2 = 0;
IF ( VSD[3] > RIGHT[3] – error_margin OR VSD[0] < RIGHT[3] +
error_margin) THEN right_detect_3 = 1; ELSE right_detect_3 = 0;
IF ( VSD[4] > RIGHT[4] – error_margin OR VSD[0] < RIGHT[4] +
error_margin) THEN right_detect_4 = 1; ELSE right_detect_4 = 0;
IF ( VSD[5] > RIGHT[5] – error_margin OR VSD[0] < RIGHT[5] +
error_margin) THEN right_detect_5 = 1; ELSE right_detect_5 = 0;
IF ( VSD[6] > RIGHT[6] – error_margin OR VSD[0] < RIGHT[6] +
error_margin) THEN right_detect_6 = 1; ELSE right_detect_6 = 0;
IF ( VSD[7] > RIGHT[7] – error_margin OR VSD[0] < RIGHT[7] +
error_margin) THEN right_detect_7 = 1; ELSE right_detect_7 = 0;
IF (right_detect_0 & right_detect_1 & right_detect_2 &
right_detect_3 & right_detect_4 & right_detect_5 &
right_detect_6 & right_detect_7) THEN RIGHT_SIGNAL_ON( );
IF (left_detect_0 & left_detect_1 & left_detect_2 & left_detect_3
& left_detect_4 & left_detect_5 & left_detect_6 & left_detect_7)
THEN LEFT_SIGNAL_ON( );
Void LEFT_SIGNAL_ON( );
    // This subroutine is triggered by a matching pattern that is
    true only for LEFT.
    // This block of code causes the Left turn signal light to
    continue flashing until apparatus 100 no longer detects a sample
    pattern matching the pattern stored as Left turn signal.
```

Many variations of the above logic will now occur to a person of skill in the art.

As described earlier, if increased reliability is desired, then the above comparison that (as assumed in this example) appears to have registered a sample pattern matching the stored pattern for "Left turn" by confirming the truth of all of:

left_detect_$_{0}$=1
left_detect_$_{1}$=1
left_detect_$_{2}$=1
left_detect_$_{3}$=1
left_detect_$_{4}$=1
left_detect_$_{5}$=1
left_detect_$_{6}$=1
left_detect_$_{7}$=1, is followed by confirmation that any suitable secondary indicia of a Left turn is also true. For example, if during the same time that the above remains true—there is also an independent indication (of repeated or cyclic changes in light intensity) from a transmitting photosensor 165 mounted on left turn signal lense 171 of vehicle 101, then it is highly probable that the left turn signal of towing vehicle 101 has been activated such that apparatus 100 should transmit related instructions to trailing vehicle 104.

It is contemplated that modified flasher cube 195 may be used with apparatus 100. Flasher cube 195 generates and emits EMF (e.g. encoded disturbance) or other signals that are between Left and Right turn signals. Apparatus 100 detects such signals from flasher cube 195 for use determining whether or not to transmit instructions to receivers on trailing vehicle 104.

It is to be understood that in circumstances of the malfunction of either vehicle 101 (i.e. its indication signal system) or apparatus 100, such that no useable pattern of measured electrostatic field strength is identified, it is a safety advantage to manually operate an indication signal system on trailing vehicle 104. Consequently, apparatus 100 is programmed with a manual override functionality that has the effect of disabling sensor array 205 and permitting an operator to use keypad 240, voice-activation, or other suitable input device to manually cause apparatus 100 to transmit instructions to receivers on trailing vehicle 104. Each embodiment of the system of the present invention that incorporates a keypad 240, provides such manual override functionality permitting keypad 240 to be used to manually trigger turn and other signals on trailing vehicle 104—even if the entire vehicle indication system of towing vehicle 101 has failed. For this safety backup application, an optional supplementary signal lever 110 may be built-in to apparatus 100, in addition to the above manual activation using keypad 240.

Figure 5:
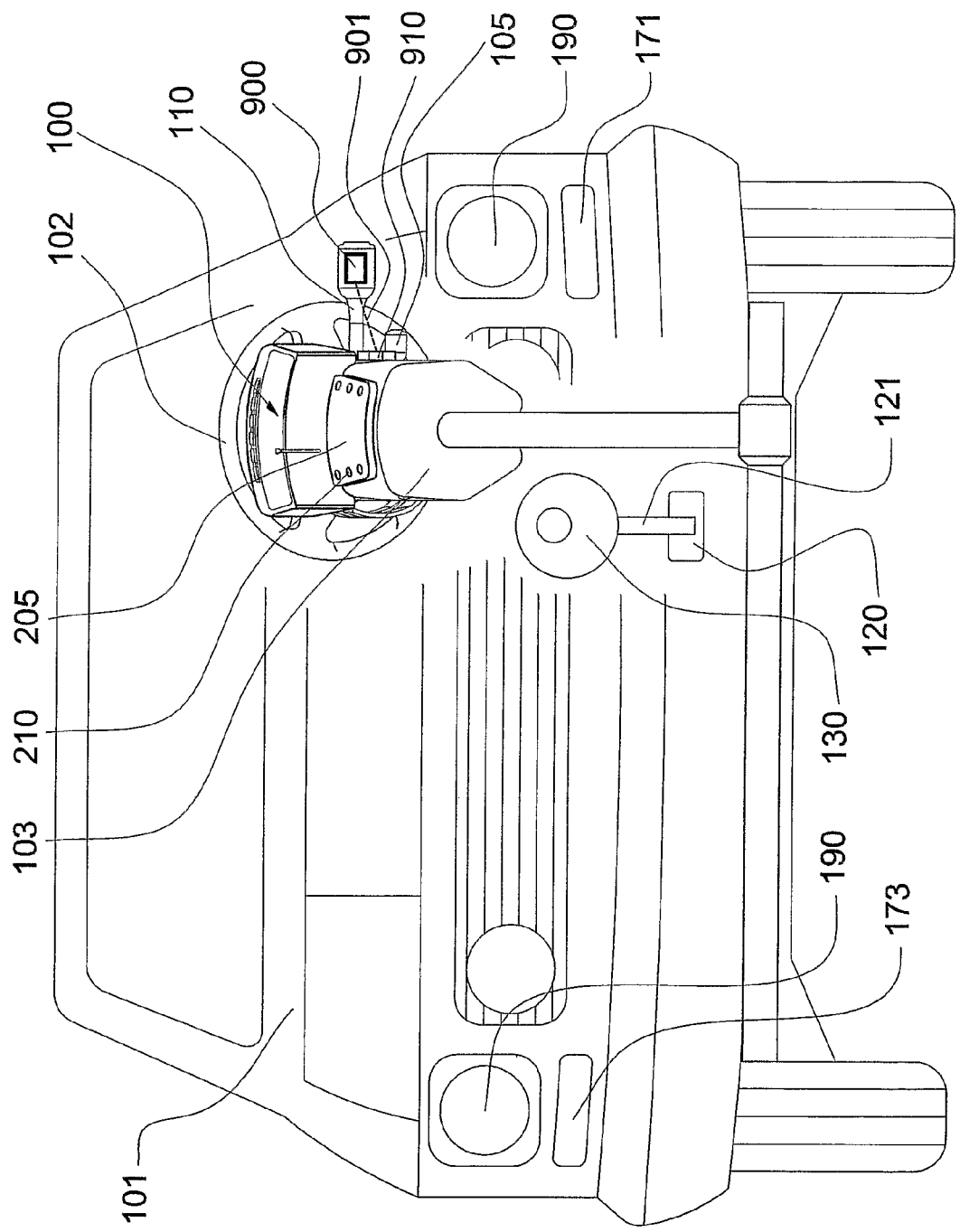
FIG. 5 illustrates one embodiment of the detector transmitter apparatus of the present invention shown in front view with a scanner feedback device installed.
Figure 6:
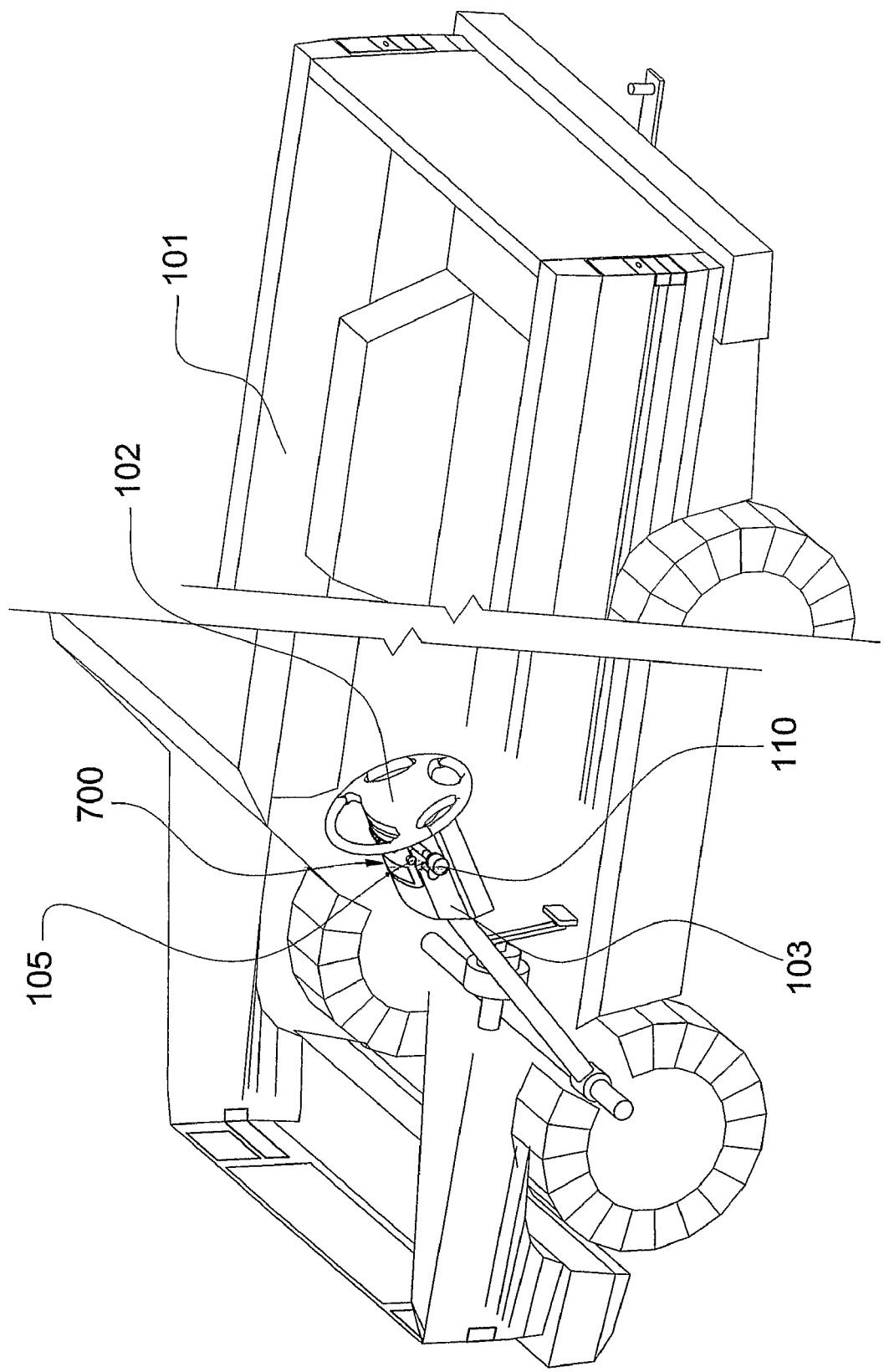
FIG. 6 illustrates an alternate embodiment of the system of the present invention shown in isometric view installed in a towing vehicle.

Referring to FIG. 5, according to an alternate embodiment of apparatus 100, activation of hazard switch 105 or other suitable emergency switch (not shown) may be used to cause receiver headlights 190 to flash or otherwise operate in response to any emergency event. For example, the original equipment headlight circuit (not shown) of towing vehicle 101 may be altered or replaced with receiver headlights 190 that comprise a suitably adapted wireless control module (not shown), such as the ABACOM AM-HRR3/6 or LEMICON RX3A useful for receiver display 150, placed in series with each headlight of vehicle 101. Receiver headlights 190 thereby have a source of electrical power permitting them to be remotely and wirelessly operated by apparatus 100. The rules pre-programmed into apparatus 100 can cause it to transmit emergency instructions automatically on specified events (e.g. whenever hazard switch 105 is operated). For example, when light is emitted from both left turn signal lense 174 and right turn signal lense 176 together on trailing vehicle 104 to indicate a "hazard", apparatus 100 could also cause each headlight 190 to flash on towing vehicle 101 to attract the attention of opposing traffic for assistance. Many variations will now occur to a person of skill in the art.

According to an alternate embodiment of the system of the present invention a "micro-laser" or other form of transmitting ("bar code" like) scanner 900 is attached to signal lever 110 with a strap (e.g. Velcro) or other suitable mechanical device to secure it to signal lever 110. Scanner 900 may also be built-in to signal lever 110 to replace vehicle 101's original equipment. A multi-part bar code label 910 (e.g. one or more self-adhesive stickers) is attached to steering column 103 proximal scanner 900 in a position where beam 901 intersects a different portion of label 910 as signal lever 110 is moved between each of its 3 standard positions (i.e. Left turn, Off, Right turn). Scanner 900 receives light that is a reflection of beam 901, which reflection depends upon the portion of label 910 from which beam 901 was reflected. The reflected light is periodically sampled and interpreted such that appropriate instructions may be wirelessly transmitted to receivers on trailing vehicle 104. According to a preferred embodiment of the system of the present invention scanner 900 communicates its position information to wireless detection apparatus 100, which processes that and other information (i.e. for increased reliability) and then transmits any instructions to receivers on trailing vehicle 104. According to an alternate embodiment of the system of the present invention, scanner 900 transmits its position information directly to receivers on trailing vehicle 104, which receivers respond according to the position of signal lever 110. Like transmitting photo-sensors 165 described using FIG. 1, system simplicity is enhanced and system costs are reduced when each scanner 900 on towing vehicle 101 is linked directly to at least one wireless receiver on trailing vehicle 104. Since signal lever 110 is "normally off", it is only necessary to have scanner 900 recognize 2 positions such that in the absence of information indicating 1 of those 2 positions the lights on trailing vehicle 104 remain inactive. However, advantageously, by having scanner 900 operate to recognize all three positions of signal lever 110 continuous error-checking is performed thereby reducing false positives or negatives.

A second transmitting scanner 900 (not shown) may similarly be attached to brake pedal arm member 121 (not interfering with the operator's foot) to scan a second label 910 attached to the interior of the firewall (not shown) between the engine and passenger compartments of vehicle 101. A scanner 900 so located wirelessly transmits information about vehicle 101's braking action to apparatus 100 for use causing brake lights on trailing vehicle 104 to emit light as appropriate. According to an alternate embodiment of the system of the present invention, scanner 900 transmits arm member 121 position information directly to receivers on trailing vehicle 104, which respond by activating brake lights on trailing vehicle 104 according to the position of brake pedal arm member 121.

According to an alternate embodiment of the system of the present invention, a transmitting inertial sensor 950 (e.g. a mercury switch) of the movement of signal lever 110, is releaseably coupled to signal lever 110 in a manner and position that causes a Left turn circuit (internal to inertial sensor 950) to be closed when signal lever 110 is moved down, and an alternate internal Right turn circuit to be closed when signal lever 110 is moved up. In the middle position of signal lever 110 neither internal circuit is closed. In a manner similar to that of transmitting bar code scanner 900 inertial sensor 950 may communicate its position either to apparatus 100 for further processing, or directly to at least one receiver on trailing vehicle 104.

Referring to FIGS. 6 through 9, two alternate embodiments of the apparatus of the present invention denoted generally as 700 and 800 are illustrated as a removable subsystem of vehicle 101, which subsystem plugs into receptacles 710 and 810 respectively in steering column 103 or steering wheel 102 from which receptacle apparatus 700 and 800 can receive power and may also interface with an identification chip (not shown) or other circuitry in vehicle 101 for the purpose security or obtaining useful information about the circumstances of vehicle 101 from other systems built-in to vehicle 101. From receptacles 710 and 810 each of apparatus 700 and 800 respectively is easily accessible to an operator to wirelessly activate all lighting message equipment (including all vehicle indication system lighting) associated with each of towing vehicle 101 and trailing vehicle 104.

Advantageously, each of apparatus 700 and 800 is a removable and portable transmitter module that is releasably coupled to vehicle 101 in a manner similar to the detachable face plate of modern automotive sound systems. When securing vehicle 101 at the end of a day's travel, an operator activates a release mechanism (not shown) that ejects apparatus 700 or 800 from its receptacle 710 or 810 respectively, such that vehicle 101 is at least partially disabled and the operator may carry the portable transmitter module to a home, hotel room, or other location until needed. Since apparatus 700 and 800 have onboard memory and power cells there is no loss of information when removed from vehicle 101. When ready to travel again, the operator simply "snaps" apparatus 700 or 800 back into its respective receptacle 710 or 810 permitting it to again electrically communicate with vehicle 101. According to a preferred embodiment of the apparatus of the present invention, apparatus 700 and 800 may be programmed to match a particular vehicle 101 such that during initialization the module "looks for a particular signature" and will only operate a particular vehicle 101 without being reprogrammed. Advantageously, any number of said removable and portable transmitter modules—having different characteristics programmed into them—may be programmed to communicate with a particular vehicle 101 such that each member of a family or company may have a personalized module that they use when operating vehicle 101. For example, in a fleet situation based on many employees operating anyone of several compatible trucks, each employee uses a personalized module that snaps into any of said trucks, but which module includes driving restrictions (e.g. maximum speed) and collects records (e.g. mileage, route, and position) that are unique to the employee rather than to the particular truck. It is contemplated that such personalized programming may be affordably implemented using removable e-cards that are unique to each operator permitting trip records to be periodically downloaded to a laptop or other computer system for record keeping (e.g. track mileage for work and personal use separately) purposes. Where modern vehicles are equipped with finger print ignition modules, alcohol detection ignition lock-out, speed governors, location (e.g. OnStar) tracking, and other control and recording functionality—apparatus 700 and 800 are coordinated with those technologies to monitor each operators' usage of a particular vehicle 101.

Figure 7:
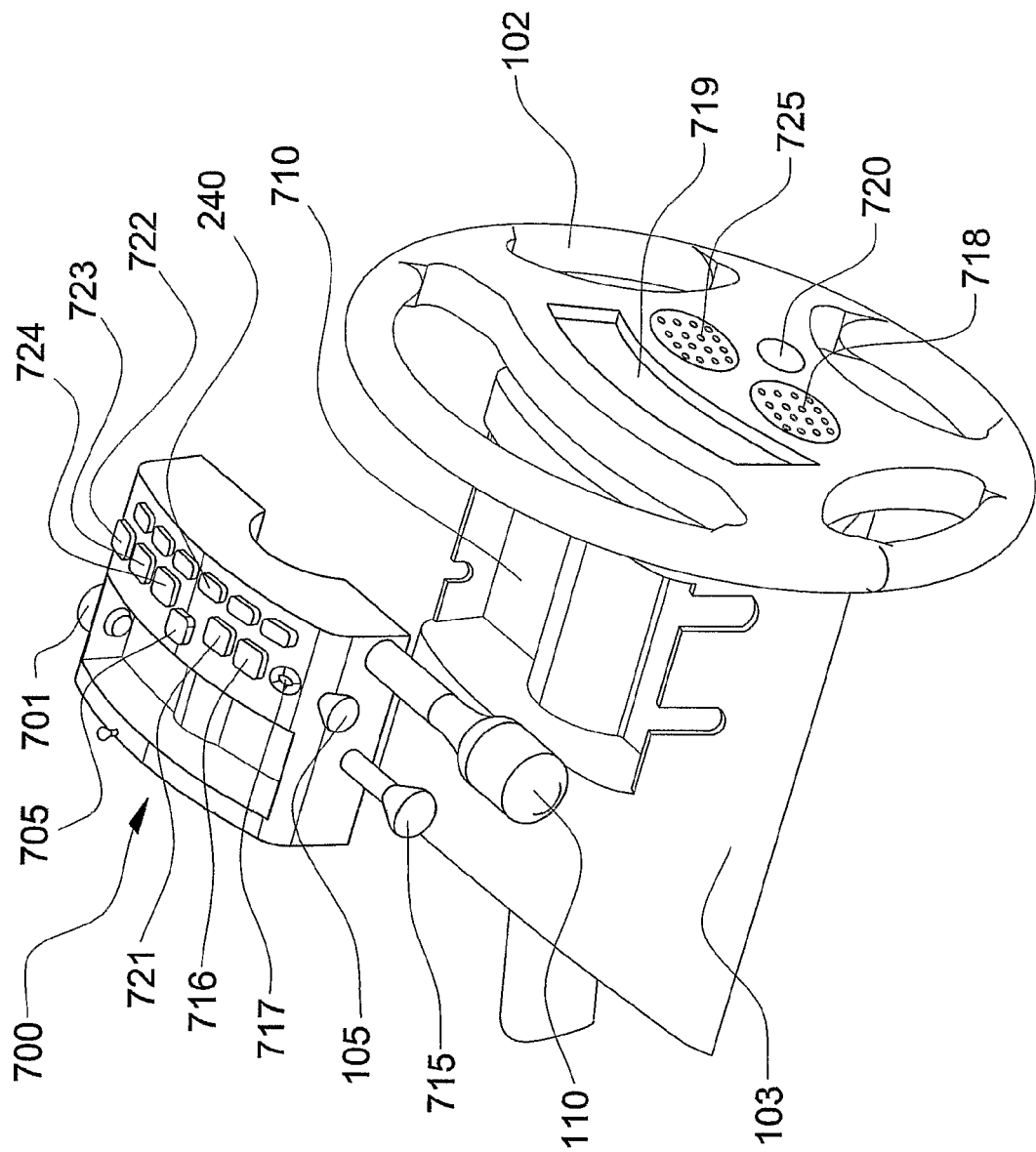
FIG. 7 illustrates an alternate embodiment of the transmitter apparatus of the present invention shown in exploded isometric view installed in a steering column.
Figure 8:
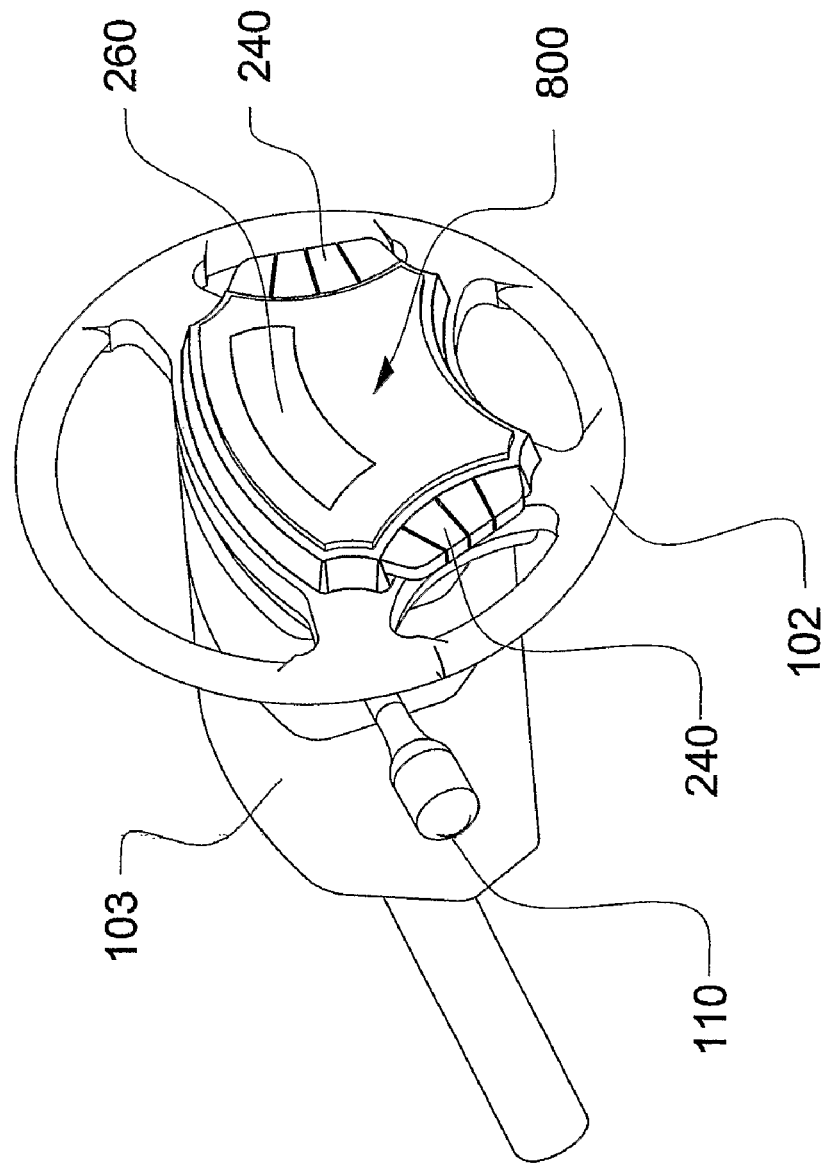
FIG. 8 illustrates a further alternate embodiment of the transmitter apparatus of the present invention shown in isometric view installed in a steering wheel.
Figure 9:
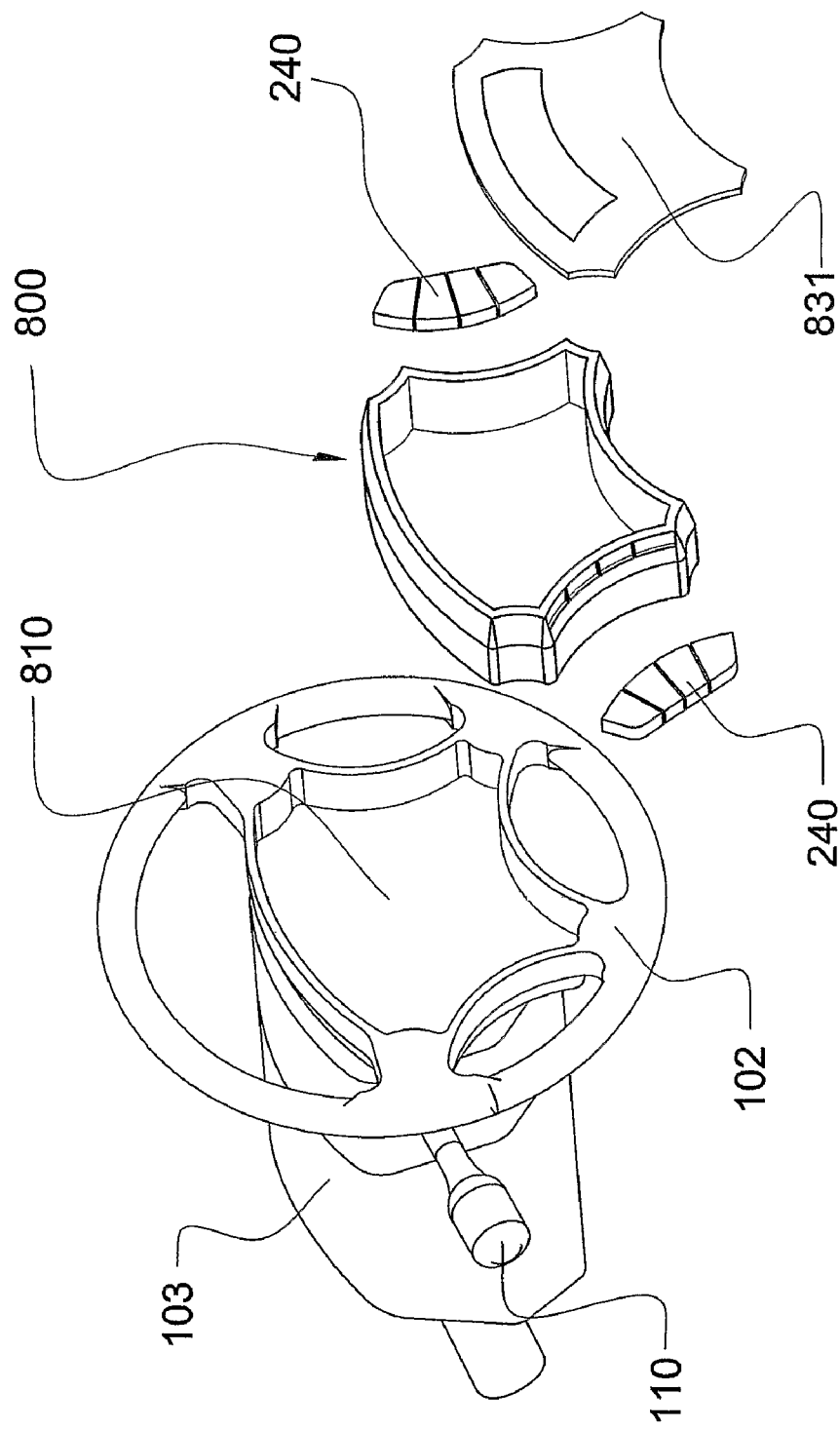
FIG. 9 illustrates an alternate embodiment of the transmitter apparatus of the present invention shown in exploded isometric view installed in a steering wheel.

Advantageously, apparatus 700 substantially eliminates conventional vehicle indicator signal wiring harnesses from vehicle 101 at the same time as wirelessly operating all message lighting on any number of trailing vehicles 104 having receivers (not shown) for decoding information transmitted from apparatus 700. As illustrated in FIG. 7, apparatus 700 incorporates: ignition switch 701, hazard switch 105, turn signal lever 110, headlight switch 705, and keypad 240 that enables apparatus 700 to communicate with or to be used as a redundant means to control virtually any equipment onboard a modern vehicle 101. For example, modern anti-lock brake control systems may be supplemented with sensor feedback components (e.g. transmitting load cells on each disc brake caliper) that provide an additional indication of braking activity in vehicle 101 in order to make the transmission of brake light related instructions to trailing vehicle 104 even more reliable. It is contemplated that apparatus 700 will optionally further incorporate: windshield wiper & washer switch 715, cruise control switch 716, hands free phone holder 717, micro-phone 718 (suitable for both phone interaction and operator voice-activated training and operation of apparatus 700 ), speaker 725, micro camera 720, radar detector 721, float brake controller 722 (for operating brakes on trailing vehicle 104 ), photosensor 723 (for automatically activating clearance, license plate, marker and running lights after dark when trailing vehicle 104 is in motion), feedback receiver 724 (for wirelessly receiving information from sway and blowout sensors mounted on the frame and wheels of trailing vehicle 104 ), Global Positioning System 719, and other modern safety and convenience devices. Apparatus 700 may, for example, communicate with a cellular phone (not shown) and all airbags in order to automatically "phone home" (or 911 ) in response to the activation of an airbag.

Advantageously, by so relocating such conventional controls from vehicle 101 into apparatus 700 the cost of manufacturing vehicle 101 is reduced and the maintenance or repair of such conventional controls is simplified and expedited by replacing apparatus 700 with a new or rebuilt module that permits a shorter turnaround time for service. The manufacturer still earns service income from rebuilding apparatus 700, but the operators' time is not wasted. It is contemplated that in retro-fit application for older vehicles having a damaged wiring harness, poor grounding, or other failures making their original equipment non-serviceable or unreliable—apparatus 700 will be quickly and easily secured (in a manner similar to that of apparatus 100 shown in FIG. 2) to steering column 103 in order to eliminate the need to use the input devices and wiring harness of vehicle 101's original vehicle indication system lighting. For example, in the rear of a truck suffering a rusted frame and broken conductors, the original "tail light assemblies" are either supplemented with or removed and replaced by a (universal or custom fit) variation of receiver display 150. Once any suitable receiver display is in position, either apparatus 100 (in manual mode) or apparatus 700 may be used to provide vehicle indication signaling without any repair or alteration of vehicle 101's original equipment.

According to an alternate embodiment of the apparatus of the present invention, apparatus 800 is illustrated mounted in a receptacle 810 located in the face of steering wheel 102. Apparatus 800 communicates with vehicle 101 and otherwise functions in a manner similar to apparatus 700, the difference is mainly that fewer of the control components of vehicle 101 reside in the removable module. Although this embodiment interferes with the placement of an airbag in steering wheel 102, advantageously it permits very easy access to at least one keypad 240, which may eliminate dedicated radio and other keypads commonly in the steering wheel of modern vehicles. Keypad 240 is useful to operate the functionality described above in apparatus 700 and is further useful to operate radio and other systems currently operated by the dedicated keypads eliminated by apparatus 800. Further, a display 260 may be integrated into the face of apparatus 800 for increasing the visibility of information about vehicle 101 to the operator. For example, whereas modern tilt steering wheels often block an operator's view of the instrument panel (e.g. speedometer) of vehicle 101, display 260 as positioned in apparatus 800 is used to relay speedometer information to a position not blocked by steering wheel 102. Similarly, road condition report information may be accessed and correlated with traction control system information to warn an operator of hazardous conditions at the current location or ahead.

According to a preferred embodiment of the system of the present invention each receiver display 150 is a multi-channel device that is portable (i.e. easily moved between vehicles), has a separate power source (e.g. batteries and a solar panel), can be switched off to preserve battery life when parked, requires minimal or no tools or time to install & remove, requires minimal or no technical knowledge or skill to install & remove, is completely submersible and dust proof, is operable independent of any "signal drive line", uses an LED or other low power consumption message delivery device, includes photocell-controlled running lights capable of engaging automatically at dusk, and enters a sleep mode automatically whenever a power down pulse is transmitted from control apparatus 100. Receiver display 150 is a multi-output device capable of emitting audible as well as visual alerts into its environment. According to one embodiment of receiver display 150 a programmable message board capable of emitting text messages (e.g. Slow Moving, Long/Wide Load, Hazard, Vehicle in Distress, HELP, Just Married, ←LEFT Turn, et cetera) is included to deliver said visual alerts into its environment.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

Although the disclosure describes and illustrates various embodiments of the invention, it is to be understood that the invention is not limited to these particular embodiments. Many variations and modifications will now occur to those skilled in the art of vehicle signaling systems. For full definition of the scope of the invention, reference is to be made to the appended claims.

We claim:

1. A detector transmitter apparatus, for use as part of a vehicle indication signal system for remote secondary signaling, the apparatus comprising:
 a base;
 wireless detection means coupled to said base, for detecting at least one primary signal without coupling to a source of signals;
 processing means communicably connected to said wireless detection means, for identifying said at least one primary signal and generating output instructions in response thereto; and
 output means communicably connected to said processing means, for wirelessly sending said output instructions to at least one remote receiver that delivers at least one secondary signal,
 wherein said wireless detection means comprises a scanner and at least one reflector affixed in a known position relative to a signal lever for detecting changes in position of said signal lever.

* * * * *